United States Patent [19]

Poppe et al.

[11] 3,795,001
[45] Feb. 26, 1974

[54] DIRECTION FINDER WITH BEARING SENSE DETERMINATION

[75] Inventors: Dag Poppe, Gjettum; Gunnar Viggo Odegaar, Simensbraten, both of Norway

[73] Assignee: International Standard Electric Corporation, New York, N.Y.

[22] Filed: May 8, 1972

[21] Appl. No.: 251,282

[30] Foreign Application Priority Data
May 7, 1971 Norway.............................. 1733/71

[52] U.S. Cl.................................. 343/119, 343/113
[51] Int. Cl................................................. G01s 3/12
[58] Field of Search...................... 343/119, 120, 113

[56] References Cited
UNITED STATES PATENTS
3,496,565  2/1970  Jenkins................. 343/119
3,344,430  9/1967  Hildebrand............ 343/119

Primary Examiner—Maynard R. Wilbur
Assistant Examiner—T. M. Blum
Attorney, Agent, or Firm—C. Cornell Remsen, Jr.

[57] ABSTRACT

A dual orthogonal loop antenna direction finding system having corresponding dual receiver channels and a reference (sense) antenna. The equipment is programmed through at least "Updating," "Bearing," "Sense" and "Display" modes in which receiver channels are phase and gain equalized, bearing readings are taken without regard to ambiguities, and corrected readings are displayed respectively. Bearing readings are stored before display until corrected by a process including relative bearing angle calculation against more than one reference vector.

8 Claims, 10 Drawing Figures

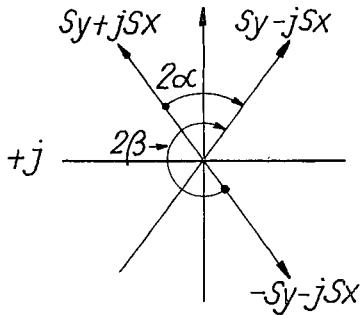
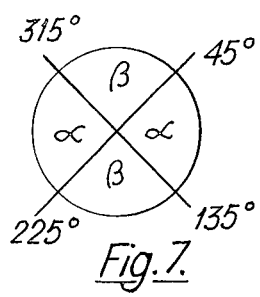
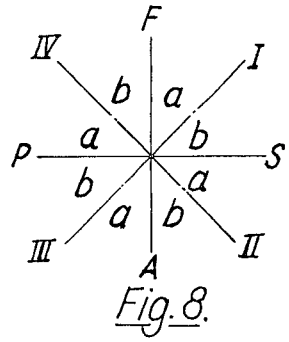
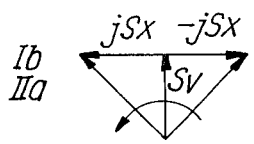
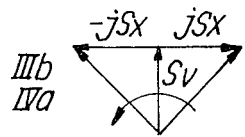
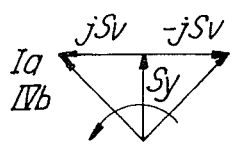
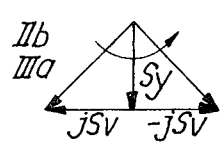
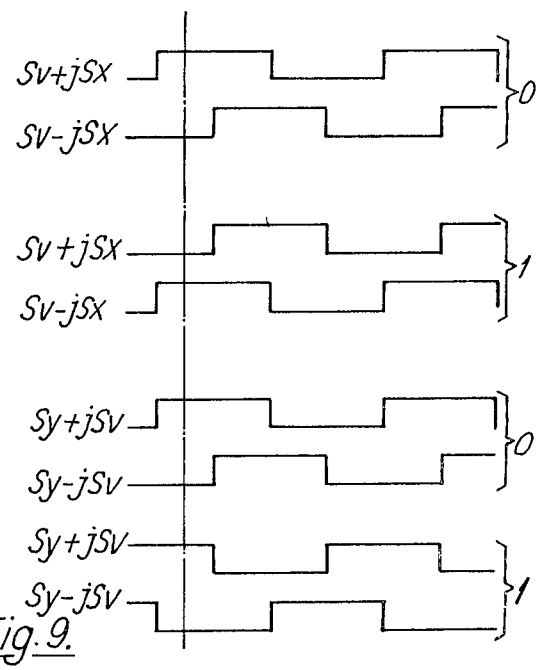
Fig. 5. Fig. 6. Fig. 7. Fig. 8. Fig. 9.

3,795,001

DIRECTION FINDER WITH BEARING SENSE DETERMINATION

CROSS REFERENCES TO RELATED APPLICATIONS

This application is filed under the provisions of 35 U.S.C. 119 with claim for the benefit of the filing of an application covering the same invention filed May 7, 1971, U.S. Pat. Ser. No. 1733/71, in NORWAY.

BACKGROUND OF THE INVENTION

1. Field of the Invention

The invention relates generally to direction finding equipment of the two channel, dual orthogonal loop antenna type. More specifically, the invention relates to means in such direction finding equipment for eliminating sense ambiguities and uncertanties in bearing determination.

2. Description of the Prior Art

In the prior art, loop antenna direction finding systems are well known. Such systems have frequently been instrumented to provided a bearing vector line on a cathode ray tube display. The vector is thus indicative of the bearing (or relative bearing) of a source of a received signal at the point of measurement. For elementary background, the reader is referred to "Radio Engineers' Handbook" by F. E. Terman (1943). See in particular, page 884 et seq.

Several U.S. patent applications relating to systems of the type to which the invention applies have been filed and assigned to the assignee of the present U.S. Pat. applications, including: Ser. No. 210,870, filed Dec. 22, 1971, Ser. No. 212,531 filed Dec. 27, 1971 (now U.S. Pat. No. 3,735,410), and Ser. No. 250,274, filed May 4, 1972. In the U.S. Pat. Ser. No. 210,870 case, a system including digital display of bearing angles is described. The referenced prior applications describe such matters as "Frequency" (tuning) and "Bearing" (determination) modes of operation which apply to systems which may include the novel combinations as hereinafter described.

Although various techniques have been employed to eliminate sense ambiguities in direction finding systems, these are generally inapplicable to the digital display systems. Elimination of spurious or ambiguous cathode ray indications in prior art systems has been variously accomplished, but such expedients do not lend themselves to the digital display approach, the type of system of which the present invention is an integral part.

In digital evaluation of bearing angles, there are inherent uncertainties which arise near zero and 180° relative to the reference direction. The manner in which the invention eliminates these and other errors, will be apparent to those skilled in this art as this description proceeds.

SUMMARY OF THE INVENTION

The object of the present invention is to provide sense determination in a direction finder system of the character described, which completely eliminates the common ambiguities as well as the uncertainties peculiar to bearing angle digital evaluation techniques.

The bearing angle is alternatively measured relatively to at least one additional (auxiliary) reference direction in order to eliminate uncertainties occurring during digital evaluation of the bearing angle when using a single reference direction. The correct bearing value is derived on the basis of quadrant information obtained by combination of the signals from the loop antennas and the sense antenna during a "Sense" time period.

To display a bearing digitally with correct sense using only two channels, it is convenient to use one of the channels for a short period to detect and store sense information, and to add this stored information to the ambiguous bearing measured with each channel normally connected to its respective loop antenna. The system according to the present invention makes use of this principle to produce a unique arrangement.

The sense information thus obtained may also be used as the basis for sense control of an analog readout, e.g., a CRT. For that, a loop signal may thus be taken directly or inversely to control the brightness of the CRT, to effect an unambiguous bearing display as a radius vector.

The foregoing and other features and objects of the present invention will be apparent from the following detailed description of an embodiment of the invention, taken in conjunction with the drawings.

BRIEF DESCRIPTION OF THE DRAWINGS

FIG. 5 indicates loop phase relationships in the four quadrants.

FIG. 6 is a vector diagram relating to evaluation of bearing angle.

FIG. 7 indicates the sectors allocated to respective reference directions.

FIG. 8 indicates an eight sector division of the bearing circle.

FIG. 9 shows vector diagrams and corresponding waveforms for evaluation of sense.

DESCRIPTION OF THE PREFERRED EMBODIMENTS

Figure 1:
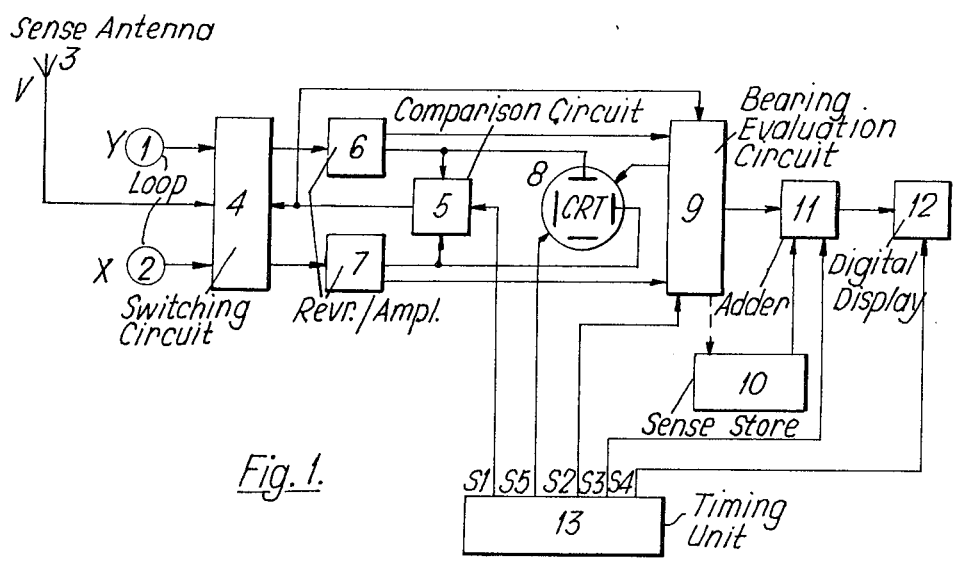
FIG. 1 shows a block schematic of a two-channel direction finder using the present invention.

Referring now to FIG. 1, a schematic block diagram of an embodiment of the invention will be seen. Two loop antennas 1 and 2, are placed at right angles to each other, while a sense antenna is provided by a vertical whip 3. These three antennas and their respective signals are designated Y, X and V, respectively, for convenience in tracing the respective signals through the circuitry. The three antennas are connected to a switching circuit 4 which is controlled by a loop signal comparison circuit 5, responsive to receivers/amplifiers 6 and 7. In practice the switching circuit 4 will also be controlled by updating means (not shown) so as to interconnect the two channels during an updating time period.

The output signals from the switching circuit 4 are submitted to amplifiers in 6 and 7, from which bearing signals are applied to the plate pairs of a cathode ray tube (CRT) 8 for display. Output signals from these amplifiers in 6 and 7 are also applied to a bearing evaluation circuit 9. This bearing evaluation circuit 9 delivers correct sense information to the CRT 8 and also to a sense storing unit 10. Ambiguous bearing information is delivered from the bearing evaluation circuit 9 to an adder circuit 11. Correct sense is delivered from the storing unit 10 and added to the ambiguous bearing information, so that a correct bearing is presented on a digital display device 12.

Figure 2:
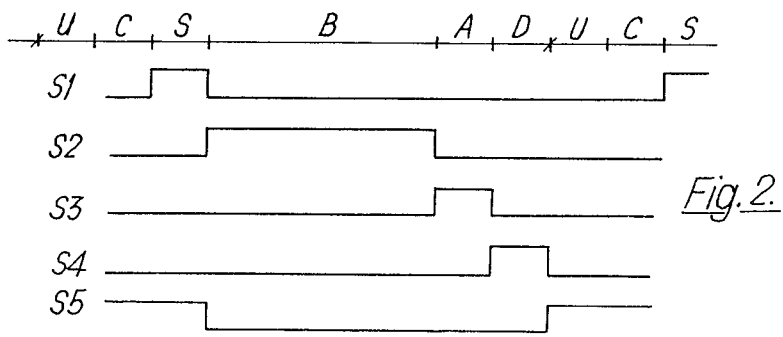
FIG. 2 depicts timing signals and waveforms relating to the circuitry of FIG. 1.

The timing of the various functions is controlled from a timing unit 13, the control signals being roughly indicated in FIG. 2.

In the direction finder described, bearings are taken automatically and periodically when it is set to its "Bearing" condition. The time interval between each bearing is divided into several repetitive sub-periods, of which the first is called the "Updating" period. The updating period U, shown in FIG. 2, is used for updating (calibrating) the gain and phase of the two receiver channels. These functions are not part of the present invention and will not be described here. The functions of the circuits of the present invention start when the circuitry is fully updated.

In the next time period C (Comparison) the switch 4 is back in its normal condition with the loops 1 and 2 connected through to the respective receiver channel amplifiers 6 and 7. Bearing results are, however, at this time not forwarded to the CRT 8 or to the digital display 12, as the case may be. During this time period the amplitudes of the loop signals are compared and the result ($x$-signal $>$ $y$-signal or $y$-signal $>$ $x$-signal) is used to control the switch 4 and the bearing evaluation circuit 9 during the next time period (sense).

During the sense time period, the loop providing the weakest signal is disconnected from its respective amplifier, and the sense antenna 3 is connected to that amplifier. The signal S1 illustrates that the comparison circuit 5, which has already detected the weakest loop signal is actuated during the time period S. At the end of this time period, the switch 4 returns to its normal condition, while switches set up in the bearing evaluation circuit 9 remain in the set up position until the next sense period. Correct sense information is determined in the circuit 9 and presented to the CRT 8, and to a digital storing circuit 10.

Figure 3:
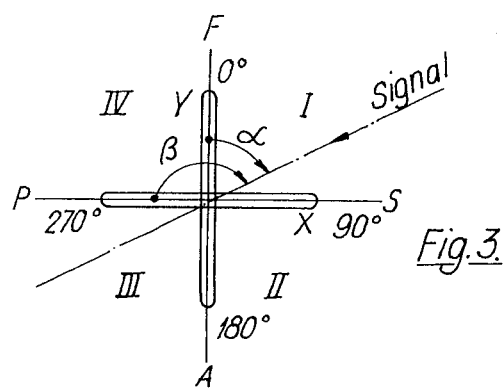
FIG. 3 illustrates the relative geometry of the loop antennas and the two reference directions.

In the following time period B (Bearing), a signal S2 from the timing circuit 13 controls the circuit 9, so that the loop signals are evaluated for presentation on the digital display 12. Several measurements are made and the average is taken to obtain an accurate result. The measurements are made relatively to a main reference direction (F) or relatively in respect to an auxiliary reference direction (P) as illustrated in FIG. 3. A result susceptible to ambiguity is accordingly presented to the adder circuit 11.

The adding of ambiguous bearing angle or value and the sense or quadrant information is effected during the next time period A (Adding) under control of the signal S3 from the timing circuit 13. Finally, the correct bearing information is transferred to the digital display device 12 during the time period D (Display). The signal S4 indicates the actuation of the display device. It should be noted that the bearing displayed during this time period remains displayed until new information is received during the next display time period.

In the final period, the timing circuit 13 delivers a signal S5 to the CRT 8 for blanking out indications present on the CRT face corresponding to CRT plate inputs during the time periods U, C and S. These time periods are so short that the correct bearing will remain displayed due to the persistence of the CRT phosphor.

FIG. 3 illustrates the loop antennas (X, Y) of the direction finder relative to the ship direction fore of course ahead (F), starboard (S) aft (A) and port ($p$). The fore direction is usually the main reference for an incoming signal, the angle $\alpha$ indicating the relative bearing. According to the present invention, there is also chosen an auxiliary reference direction, which in the described embodiment is the portion direction, the measured angle in this case being $\beta = \alpha + 90°$. The four quadrants in which the signal may arrive are designated I, II, III, IV.

Figure 4:
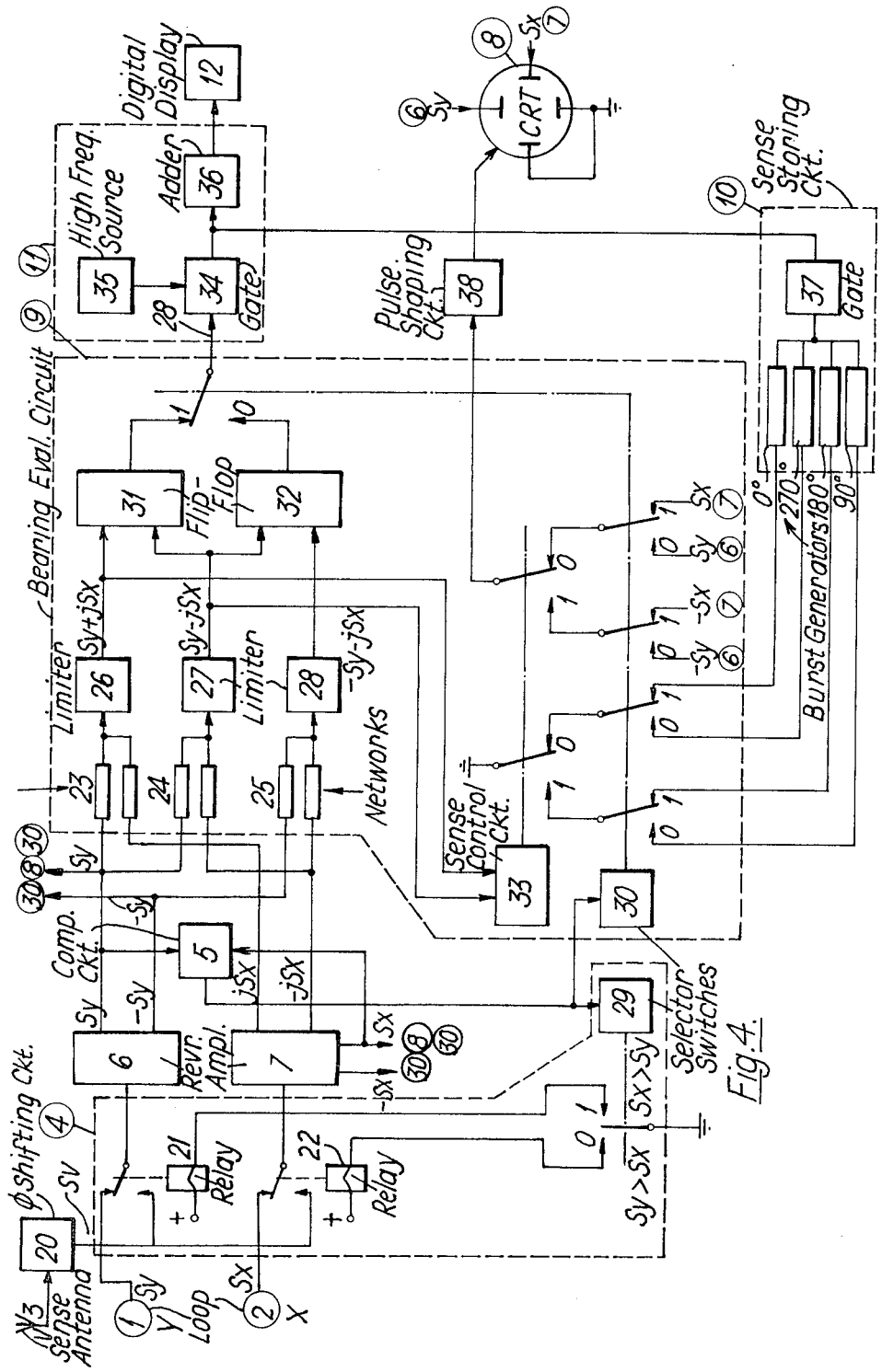
FIG. 4 shows a more detailed block diagram of the invention.

In order to further clarify the principles of the invention, a more detailed block schematic is shown in FIG. 4. The same reference numbers are used when applicable. Signal diagrams, FIGS. 5–10, will be referred to in explanation of FIG. 4. The timing circuit 13 is, however, not shown in FIG. 4 as not to unnecessarily complicate the schematic.

In FIG. 4 the signal from the sense antenna 3 is processed in a phase shifting circuit 20 such that the resulting output voltage $sv$ is approximately in phase with the loop voltages when the direction of the incoming signal is in the first quadrant (I, FIG. 3). The phase relationships between the loop signals ($sy$, $sx$) and the processed sense signal ($sv$) in the various quadrants, are indicated in FIG. 5. The first quadrant signals are used as reference; arrows pointing in the same direction denoting signals in phase. The signal $sy$ from the Y-loop 1 passes via the contact of a relay 21, shown closed, to the amplifier 6 having output signals designated $Sy$ and $-Sy$. This path will be referred to as the $y$-channel. Similarly the signal $sx$ from the X-loop 2 passes via the corresponding contact of relay 22 to the receiver-amplifier 7, with output signals desingated $jSx$ and $-jSx$. This path is called the $x$-channel. The arrow outputs $-Sy$, $Sy$, $Sx$, $-Sx$ are used for controlling the CRT and will be discussed later.

In ordinary CRT direction finders, the bearing angle is displayed by direct connection of the sinusoidal signals $Sy$ and $Sx$ to respective orthogonal deflection plate pairs. To obtain a digital presentation it is necessary to represent the bearing as a phase angle between electrical vectors, which in the present invention, is done by generating the vectors $(Sy + jSx)$ and $(Sy - jSx)$, this angle being $2\alpha$ for the main reference direction. [For the auxiliary reference direction the angle $2\beta$ is obtained between $(-Sy - jSx)$ and $(Sy-jSx)$]. FIG. 6 shows the electrical vector diagram for an incoming signal arrivng in the first quadrant (I, FIG. 3), $Sy$ and $Sx$ being both positive.

Returning to FIG. 4, the output signals from 6 and 7 $(Sy, -Sy, jSx, -jSx)$ are vectorially added in networks 23, 24 and 25 and passed through limiters 26, 27 and 28 on the output of which there will appear signals $(Sy + jSx)$, $(Sy - jSx)$ and $(-Sy-Sjx)$, respectively. These three signals are indicated in FIG. 6 showing, as above-mentioned, the first quadrant situation while the angle $2\alpha$ between $(Sy + jSx)$ and $(Sy - jSx)$ corresponds to twice the bearing angle $\alpha$, the angle $2\beta$ between $(-Sy -jSx)$ and $(Sy - jSx)$ corresponds to twice to the angle $(\alpha + 90°)$. This will be described in further detail in connection wih FIG. 10.

When the bearing angle $\alpha$ is to be measured digitally, a difficulty arises when $\alpha$ approaches zero, because the angle evaluation may vacillate between zero and 360°. There will also be difficulty when $\alpha$ approaches 180°, because $\alpha$ and ($\alpha + 180°$) will be evaluated as the same angle. In the present invention this difficulty is eliminated because the angle $\beta$ is measured in the difficulty sectors.

In FIG. 7 is shown a diagram indicating that the angle $\alpha$ is measured when the incoming signal is between 45° and 135° or between 225° and 315°, while the angle $\beta$ is measured in the remaining sectors which include $\alpha = 0°$ and $\alpha = 180°$. The comparison circuit 5 and the bearing evaluation circuit 9 are used to determine whether $\alpha$ or $\beta$ should be measured and to eliminate the ambiguity.

As mentioned in connection with FIG. 1 the loop signals are applied, via amplifiers 6 and 7 respectively, to a comparison circuit 5 in which the relative strength of $|sy|$ is compared with $|sx|$. The four quadrants may for further consideration be divided into eight sectors I$a$, I$b$, II$a$, and so forth as indicated in FIG. 8. The circuit 5 decides whether $sy > sx$ or $sx > sy$ and sets up selector switches 29 and 30 during the sense time period (S, FIG. 2). If $sx$ and $sy$ are nearly equal, the circuit 5 will decide on either of the two conditions. The switch 29 is normally in a neutral position, but is switched to its 1-position or 0-position during the sense time period. When $sy > sx$, the relay 22 is operated so that the sense antenna is connected to the $x$-channel. Similarly if $sx > sy$, the relay 21 is operated, connecting the sense antenna to the $y$-channel. As soon as the sense time period has ended, the switch 29 returns to its neutral position.

The selector switch 30 memorizes the condition detected and is shown with its contacts in the 1-position, indicating that the condition $sx > sy$ was detected during the last sense time period. When $sx > sy$, this means that the incoming signal is being received on sectors I$b$, II$a$, III$b$ or IV$a$ (FIG. 8) and that the main reference direction is used. These sectors will be referred to as the $\alpha$-sectors.

The output from the bearing evaluation circuit 9 is taken from one of two flip-flop circuits 31 and 32. The correct alternative is chosen by a contact set on the switch 30. The contacts of 30 are illustrated as being ganged and the block 30 is the actuator portion of the relay.

The flip-flop 31 flips to its one-state at a positive zero-crossing of $(Sy + jSx)$, and back to zero-state at $(Sy - jSx)$, the output being indicative of an ambiguous $\alpha$-angle. Similarly the flip-flop 32 flips to its one-state at $(-Sy - jSx)$ and back to the zero-state at $(Sy - jSx)$, this output being indicative of an ambiguous $\beta$-angle. The ambiguity of the outputs is corrected by the sense storing circuit 10, the selected output of which is a burst of pulses corresponding to 0° (i.e., no pulses) 270°, 180° or 90°. The sense storing circuit 10 is set up by the switch 30 as mentioned previously and by a sense control circuit 33 controlled as shown by the outputs from the limiters 26 and 27. The determination of this information will be described in connection with FIG. 9.

In FIG. 9, examples of the phase relationship of the signals present at the outputs of the limiters 26 and 27 during the sense time period are shown. Consider first the diagram of FIG. 5, showing phase relationships of the antenna signals $sx$, $sy$ and $sv$. The outputs $Sy$ and $-Sy$ from 6 correspond in phase to the signals $sy$ and $-sy$. The outputs $jSx$ and $-jSx$ from the amplifier 7 are, however, phase shifted counterclockwise 90° relative to the signals $sx$ and $-sx$ (and $Sx$, $-Sx$ presented to switch 30 contacts for control of the CRT).

In sectors I$b$ and II$a$ (FIG. 8) the comparator 5 decides that $|sx| > |sy|$, with the result that the sense signal is substituted for the $y$-signal. Referring now to FIG. 5, the outputs of the amplifier 6 will have phases as shown in the $sv$-column, these signals now being designated $Sv$ and $-Sv$, while the outputs from the amplifier 7 will be 90° phase shifted relative to the $sx$ column, as explained above. The vectors of output signals $(Sv + jSx)$ and $(Sv - jSx)$ are illustrated at the top left of FIG. 9, and it appears that $(Sv - jSx)$ lags $(Sv + jSx)$. This situation will, as shown at the top right of FIG. 9, be expressed as a 0-position of the control switch 33. This is the state in which the contacts in block 9 are shown, and indicates that a burst generator "0°" in the storing unit 10 is enabled. In physical terms, this means that no addition or correction has to be made to the measured angle.

In sectors III$b$ and IV$a$, (FIG. 8) $sx$ is still evaluated to be greater than $sy$, so that the sense signal $sv$ is substituted for $sy$. As will be seen from FIG. 5 the $sx$ signals are 180° phase shifted relative to the situation in sectors I$b$ and II$a$. When the vectorial output signals are evaluated as shown in the next line in FIG. 9, it will be seen that $(Sv + jSx)$ lags $(Sv - jSx)$. This will appear as a 1-position of the control switch 33, and indicates that a burst generator "180°" in the storing unit 10 is enabled. This therefore means that 180° will be added to the measured angle.

In sectors I$a$ and IV$b$, the comparator 5 decides that $sy > sx$ and the sense signal is therefore substituted for the $x$ signal. Returning to FIG. 5 the $sv$ column is now substituted for the $sx$ column and, remembering that a 90° counterclockwise phase shift takes place in 7, the signals to be evaluated are $(Sy + jSv)$ and $(Sy - jSv)$. As illustrated in the third line of FIG. 9, $(Sy + jSv)$ leads $(Sy - jSv)$, this situation appearing as a 0 position in the control switch 33. In these sectors the contacts of the switch 30 are in their 0-position so that the burst generator "270°" in the storing unit 10 is now enabled. Now 270° must be added to the measured angle in order to obtain the correct bearing angle.

In the last sectors to be considered, i.e., II$b$ and III$a$, $sy$ is still greater than $sx$, and the vector diagram shows that $(sy + jSv)$ now lags $(Sy - jSv)$, whereby a 1-position appears in the control switch 33. The contacts of switch 30 are still in their 0-position, indicating that the burst generator "90°" is enabled.

Having now dealt with the setting-up of the storing unit 10, the actual bearing angle measurements can be considered.

Figure 10:
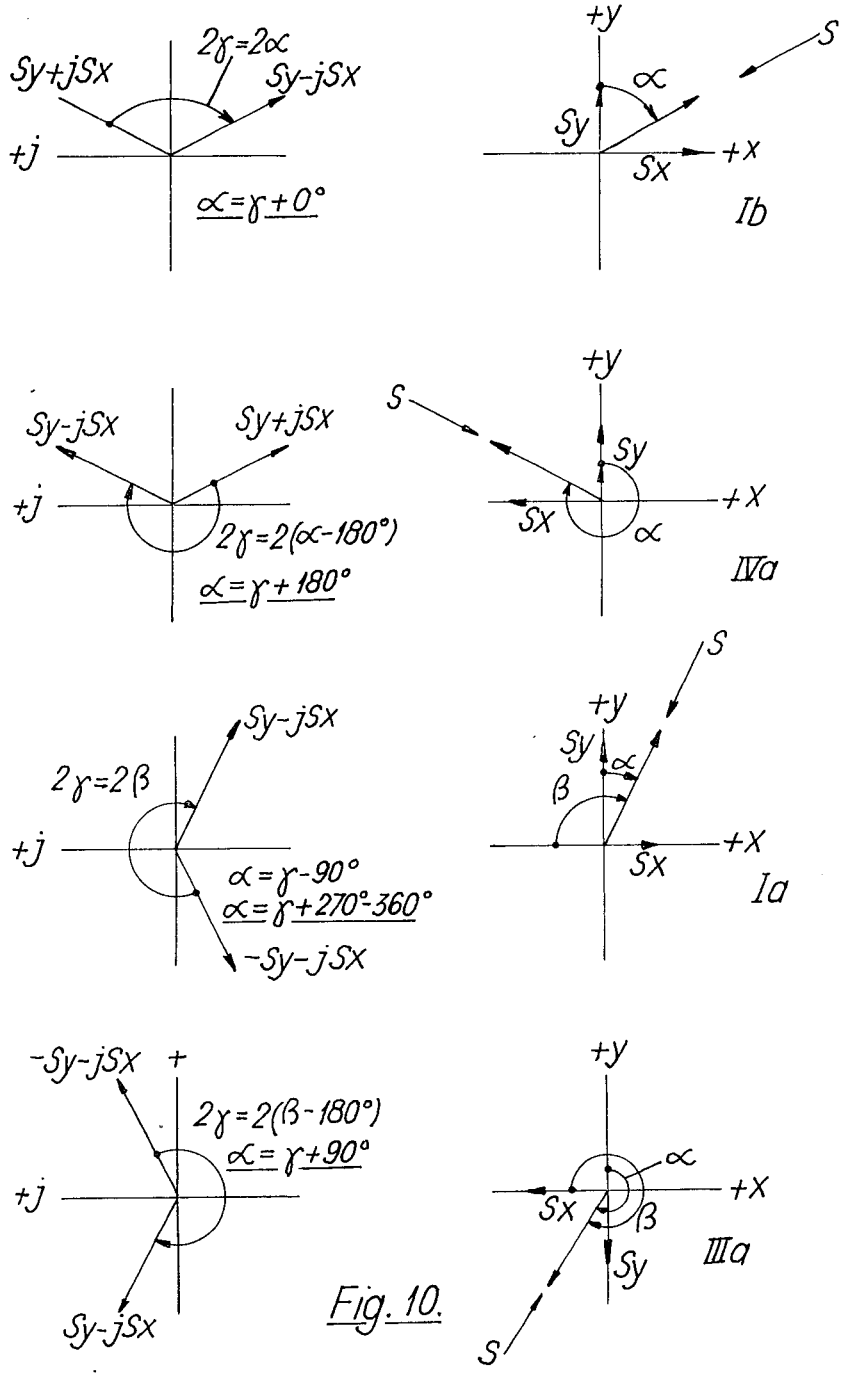
FIG. 10 shows vector diagrams for evaluation of bearing angles.

A further vector diagram, FIG. 10, has been included to show how the space vectors of the incoming signals are related to the electrical vectors handled in the bearing evaluation circuit 9, and also how the correct adding values are determined.

It will be recalled that the signals $(Sy + jSx)$ and $(Sy - jSx)$ are used for evaluation of the bearing angle when the incoming signal is in the $\alpha$-sectors (FIG. 7), and that $(-Sy - jSx)$ and $(Sy - jSx)$ are used for evaluation of bearing angles in the $\beta$-sectors (FIG. 7).

The signals delivered from the flipflops 31 and 32 are selected by the 30-contacts at the output of these flipflops are pulses starting with a positive-going zero-crossing of $(Sy + jSx)$ and $(-Sy - jSx)$ respectively and ending with the next following positive going zero-crossing of $(Sy - jSx)$ (in both cases). These pulses represent a phase angle $2\gamma$ which will be explained in connection with FIG. 10.

When the incoming signal arrives in sector Ib (FIG. 8) it may be decomposed into two vectors $sx$ and $sy$, both positive. This is illustrated at the upper right of FIG. 10. Sector Ib is an $\alpha$-sector and the space vectors are therefore converted into the electrical vectors $(Sy + jSx)$ and $(Sy - jSx)$ in the electrical vector diagram at the upper left of FIG. 10. The start vector $(Sy + jSx)$ occurs in the upper left quadrant while the stop vector $(Sy - jSx)$ occurs in the upper right quadrant, and the angle between these two vectors, measured clockwise is $2\gamma$. By comparison of the $2\gamma$ angle with the $\alpha$-angle it is clear that $2\gamma = b\alpha$ and that $\alpha = \gamma + 0°$, meaning that no correction is necessary.

This same result ($2\gamma = 2\alpha$, and $\alpha = \gamma + 0°$) will be obtained when considering the sector IIa, only now the electrical vectors occur in the quadrants below the imaginary axis, because the $sy$ vector is negative.

When the incoming signal arrives in sector IVa this is still an $\alpha$-sector and the vectors, as shown to the right in the second line of FIG. 10, are a positive $sy$ and a negative $sx$. Converted into electrical vectors, the negative $sx$ components inserted into the expression $(Sy + jSx)$ will make the imaginary part $jSx$ negative. The electrical (start) vector $(Sy + jSx)$ will thus now occur in the upper right quadrant, while the (stop) vector $(Sy - jSx)$ will occur in the upper left quadrant. The phase difference (measured clock-wise) between the start and stop vectors is $2\gamma$, which by comparison, is equal to $2(\alpha - 180°)$, meaning that $\alpha = \gamma + 180°$.

The situation of sector IIIb has not been shown as this is similar to IVa, except for the fact that both signal components are now negative. The electrical vectors will thus occur below the imaginary axis, but the angle measured will still be $2\gamma = 2(\alpha - 180°)$, so that the corresponding correction must be 180°.

Next, the sector Ia will be considered. This is a $\beta$-sector (FIG. 7) and as shown the signal components $sy$ and $sx$ are both positive. However, the electrical vectors are, in this case, chosen to be $(-Sy - jSx)$ and $(Sy - jSx)$, the angle $2\gamma$ being measured clockwise from the former to the latter. The start vector $(-Sy - jSx)$ occurs in the lower right quadrant while the stop vector $(Sy - jSx)$ occurs in the upper quadrant. The measured angle $2\gamma$ is seen to be equal to $2\beta$, and recalling that $\beta = \alpha + 90°$, it is seen that $\alpha = \gamma - 90°$ or $\alpha = \gamma + 270°$, because when the measured angle is greater than 360°, only the excess thereover will be registered.

The situation in the $\beta$-sector IVb is similar to that in sector Ia, the correct addition being 270°. The signal component $sx$ will, in this case, be negative so that the electrical vectors will occur at the left side of the real axis. The measured angle $2\gamma$ will, however, still be $2\beta$.

Turning now to the bottom line of FIG. 10, the $\beta$-sector IIIa is considered. Both components $sy$ and $sx$ are negative and the electrical start vector occurs in the upper left quadrant. The stop vector $(Sy - jSx)$ occurs in the lower left quadrant and the measured angle $2\gamma$ is $2(\beta - 180°)$, meaning that $\alpha = \gamma + 90°$.

In the last sector to be considered (IIb), the situation is similar to that of sector IIIa, meaning that 90° has to be added to the measured $\gamma$-angle.

The above evaluation may be summarized as follows in tabular form.

| Sector FIG. 8 | Comparison Switch 30 | Sense Switch 33 | Reference Direction | Degrees |
|---|---|---|---|---|
| Ib | 1 | 0 | 0° (F) | 0 |
| IIa | 1 | 0 | do. | 0 |
| IIIb | 1 | 1 | do. | 180 |
| IVa | 1 | 1 | do. | 180 |
| Ia | 0 | 0 | 270° (p) | 270 |
| IVb | 0 | 0 | do. | 270 |
| IIb | 0 | 1 | do. | 90 |
| IIIa | 0 | 1 | do. | 90 |

The adder unit 11 and the read-out will now be described briefly. The $2\gamma$-pulse selected to be presented to a gate 34 is gated against high frequency pulses N arriving from a high frequency source 35, so as to present to an adding circuit 36 a number of pulses indicative of the angle $\gamma$.

At the adding time period (A, FIG. 2) a gate 37 releases the appropriate burst of pulses so that at the display time period the number of pulses presented to the display 12 correspond to the correct bearing angle $\alpha$.

As mentioned previously several measurements are taken, which are averaged, but this procedure is not part of the present invention and will not be described here.

Briefly, the CTR-presentation may now also be described. The $Sy$ and $Sx$ outputs from 6 and 7, respectively, are applied to the corresponding plate pairs of the CRT 8. The sense is controlled by the switches 30 and 33, and the CRT display is blanked out during the negative half periods of the selected signal. The blanking signal shaped in a pulse shaping circuit 38, ensures that the correct radius vector is displayed.

In the above specification it has been assumed that continuous $x$, $y$ and $v$-signals are received. If, however, the transmission is interrupted, as the case may be for grouped maritime beacons which state their morse call identification one or more times followed by a long dash, erroneous sense and bearings may be taken. This may be prevented by the use of level detectors in both channels, demanding sufficient signal levels before sense is determined. It is sometimes practical to delay updating, comparison, sense and bearing measurements for a short time when such interruptions are detected.

The above described embodiment of the invention is not to be considered as a limitation on the scope of protection, but rather as typical and illustrative of the principles of the invention.

What is claimed is:

1. A direction finding system for determining the bearing of the source of a selected signal, said system having dual orthogonal loop antennas and corresponding receiver channels responsive thereto, and including a separate substantially omni-directional sense antenna, comprising the combination of:
   programming means for operating said system periodically in a bearing determining mode and in at least successive comparison, sense and addition modes between successive bearing determining periods;
   first means responsive to signals received through said loops and corresponding receiver channels for determining a preliminary bearing value for said source without regard to ambiguities;

means for temporarily storing said preliminary bearing value;

second means operative during said comparison mode for comparing signal component amplitudes in orthogonal coordinates from said loops and corresponding receiver channels to produce a switching signal as a function of the angular bearing sector from which said selected signal was received;

third means operative during said sense mode for substituting said sense antenna for the one of said loops having the lowest signal amplitude and for generating a control signal descriptive of the correct sense of said preliminary bearing value; and fourth means operative during said sense and addition modes, including a bearing evaluation circuit responsive to said preliminary bearing value and to said switching and control signals to generate a corresponding nonambiguous bearing value.

2. Apparatus according to claim 1 in which said means for determining said preliminary bearing computes said preliminary bearing as relative values discretely with respect to primary and secondary reference vectors, and in which said fourth means includes means for evaluating both of said preliminary bearing values to provide a single corresponding non-ambiguous bearing value.

3. Apparatus according to claim 2 in which said secondary reference vector is 90° shifted in bearing angle with respect to said primary vector.

4. Apparatus according to claim 3 in which said primary and secondary reference vectors are the fore direction of the vessel on which said system is mounted and the port direction thereof, respectively.

5. Apparatus according to claim 1 further defined in that said angular bearing sector is defined as being a quadrant.

6. Apparatus according to claim 1 in which said third means includes means for generating said control signal by comparison of the phase of the combined signal produced by adding said sense antenna and loop signals.

7. Apparatus according to claim 3 further defined in that said bearing evaluation circuit includes means for selecting the one of said preliminary bearing values most removed from bearing angles of possible measurement ambiguity and for providing a fixed correction thereto to produce said single non-ambiguous bearing value.

8. Apparatus according to claim 7 including at least digital display means connected to present said non-ambiguous bearing value, said display being controlled by said programming means to limit said presentation to predetermined times following operation of said fourth means.

* * * * *